United States Patent
Bankus et al.

(10) Patent No.: US 12,451,778 B2
(45) Date of Patent: Oct. 21, 2025

(54) SYSTEMS AND METHODS FOR REFURBISHMENT OF MOTOR GENERATORS

(71) Applicant: The United States of America as represented by the Secretary of the Navy, Keyport, WA (US)

(72) Inventors: Nicholas J Bankus, Poulsbo, WA (US); Joel S Galles, Poulsbo, WA (US); Alexander R. N. Read, Bremerton, WA (US); Derek L Mikesell, Silverdale, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 0 days.

(21) Appl. No.: 18/565,078

(22) PCT Filed: Nov. 28, 2023

(86) PCT No.: PCT/US2023/081446
§ 371 (c)(1),
(2) Date: Nov. 28, 2023

(87) PCT Pub. No.: WO2024/118669
PCT Pub. Date: Jun. 6, 2024

(65) Prior Publication Data
US 2025/0279707 A1    Sep. 4, 2025

Related U.S. Application Data

(60) Provisional application No. 63/428,395, filed on Nov. 28, 2022.

(51) Int. Cl.
H02K 15/50    (2025.01)
B23P 6/00    (2006.01)

(52) U.S. Cl.
CPC ............... *H02K 15/50* (2025.01); *B23P 6/00* (2013.01)

(58) Field of Classification Search
CPC .. B23P 6/00; B23P 6/04; H02K 15/50; H02K 15/00
See application file for complete search history.

(56) References Cited

U.S. PATENT DOCUMENTS

2010/0242247 A1* 9/2010 Jones .................. B23P 6/00 29/33 R
2017/0056976 A1* 3/2017 Len ..................... B23B 5/28

* cited by examiner

*Primary Examiner* — Christopher J. Besler
(74) *Attorney, Agent, or Firm* — Stephen J. Leahu; Naval Undersea Warfare Center, Keyport NAVSEA, Dept. of Navy, U.S. Gov't

(57) ABSTRACT

Systems and methods are provided to refurbish a commutator in-place without disassembly of a motor generator. The disclosed system may include a drive/brake system for controlling the rotation of the commutator during the refurbishment process, and a multi-axis Computer Numerical Control (CNC) motion and machining platform for controlling processing and refurbishment devices that traverse the commutator surface. Such devices may include an undercutting device to remove dielectric material from between commutator bars, a stoning device to obtain a polished surface finish for the commutator, and a chamfering device to remove burrs at the edges of the commutator grooves left by the stoning process. Alignment and inspection devices may be utilized along with mobile panels and cameras. The subsystems and components of the disclosed system may comprise a modular implementation designed for transportation and assembly in space-constrained environments.

5 Claims, 11 Drawing Sheets

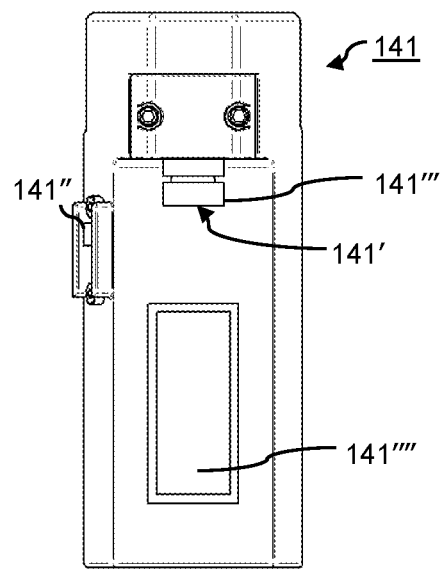# 
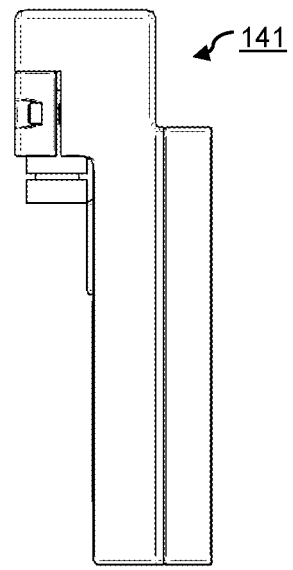
Figure 6A
Figure 6B
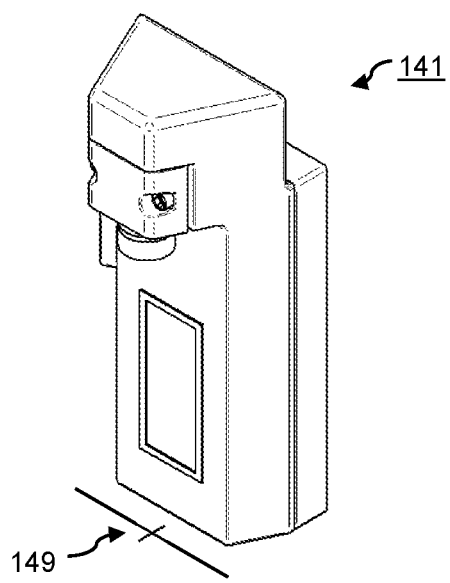
Figure 6C

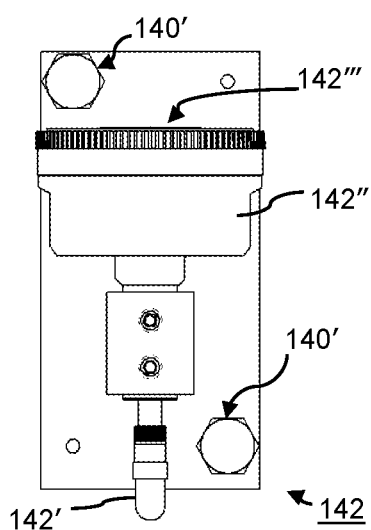 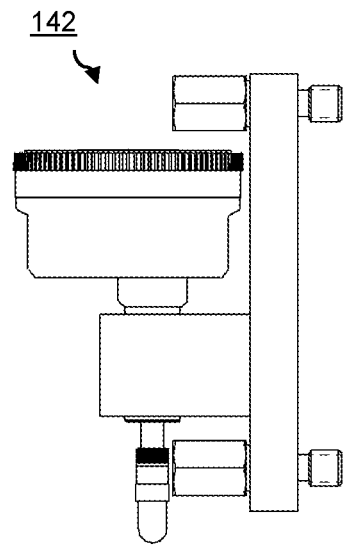
Figure 7A   Figure 7B
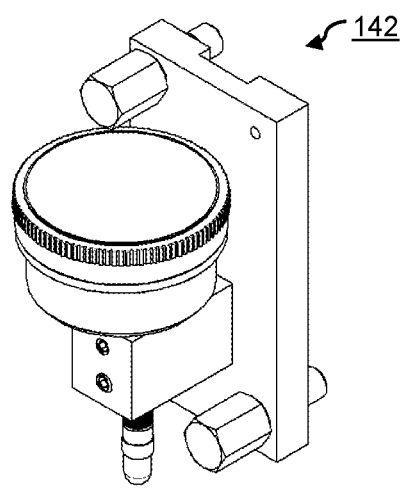
Figure 7C

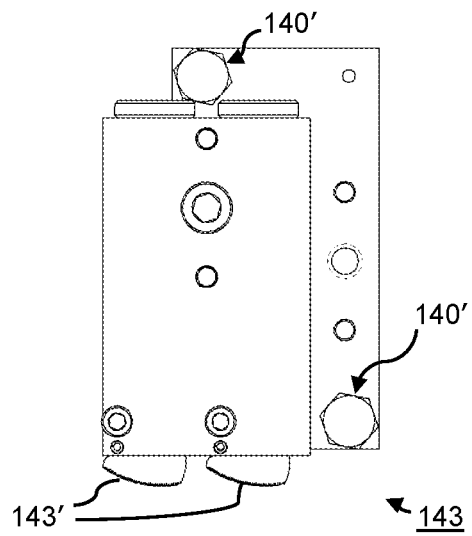
Figure
8A
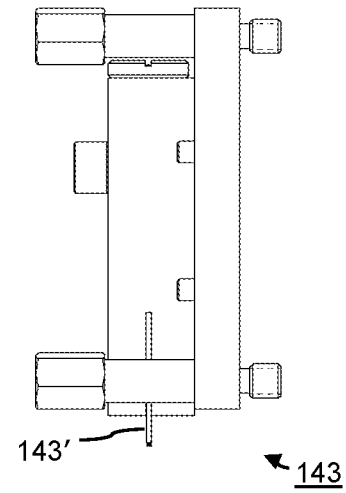
Figure
8B
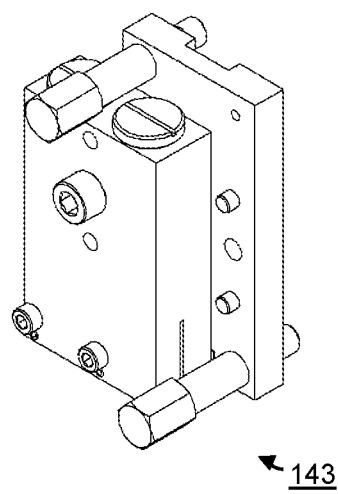
Figure
8C
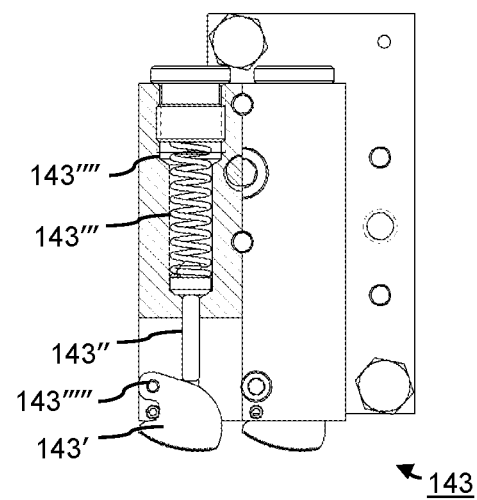
Figure
8D

SYSTEMS AND METHODS FOR REFURBISHMENT OF MOTOR GENERATORS

CROSS REFERENCE TO RELATED APPLICATION

This non-provisional patent application claims priority to, and incorporates herein by reference in its entirety, U.S. Provisional Patent Application No. 63/428,395 that was filed Nov. 28, 2022.

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the field of refurbishment methods for components of motor generators (MG), such as commutators and other electrical rotors such as slip rings, and in particular to systems and methods and apparatuses for undercutting, stoning/polishing, chamfering/deburring and inspecting MG commutators using a robotic control system and user interface.

BACKGROUND

Basic techniques for the manual refurbishment of motors are known in the art. Past methods for the manual refurbishing motors, however, are time-consuming and produce inconsistent results. Improved solutions are desired for automating the refurbishment processes of large motors. Features of the present disclosure overcome various deficiencies of the prior art by providing a method, system and apparatus having advantages that will become apparent from the following disclosure.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same components throughout the various views. The drawings are not necessarily to scale; emphasis instead being placed upon illustrating principles of the present disclosure.

FIGS. 6A-6C illustrate front, side and prospective views of an exemplary laser alignment device for the CNC machining/motion platform shown in FIG. 5, in accordance with certain embodiments of the present disclosure.

FIGS. 7A-7C illustrate front, side and prospective views of an exemplary inspection device for the CNC machining/motion platform shown in FIG. 5, in accordance with certain embodiments of the present disclosure.

FIGS. 8A-8D illustrate front, side, prospective and cross-sectional views of an exemplary undercutting device for the CNC machining/motion platform shown in FIG. 5, in accordance with certain embodiments of the present disclosure.

BRIEF SUMMARY OF THE DISCLOSURE

Figure 1:
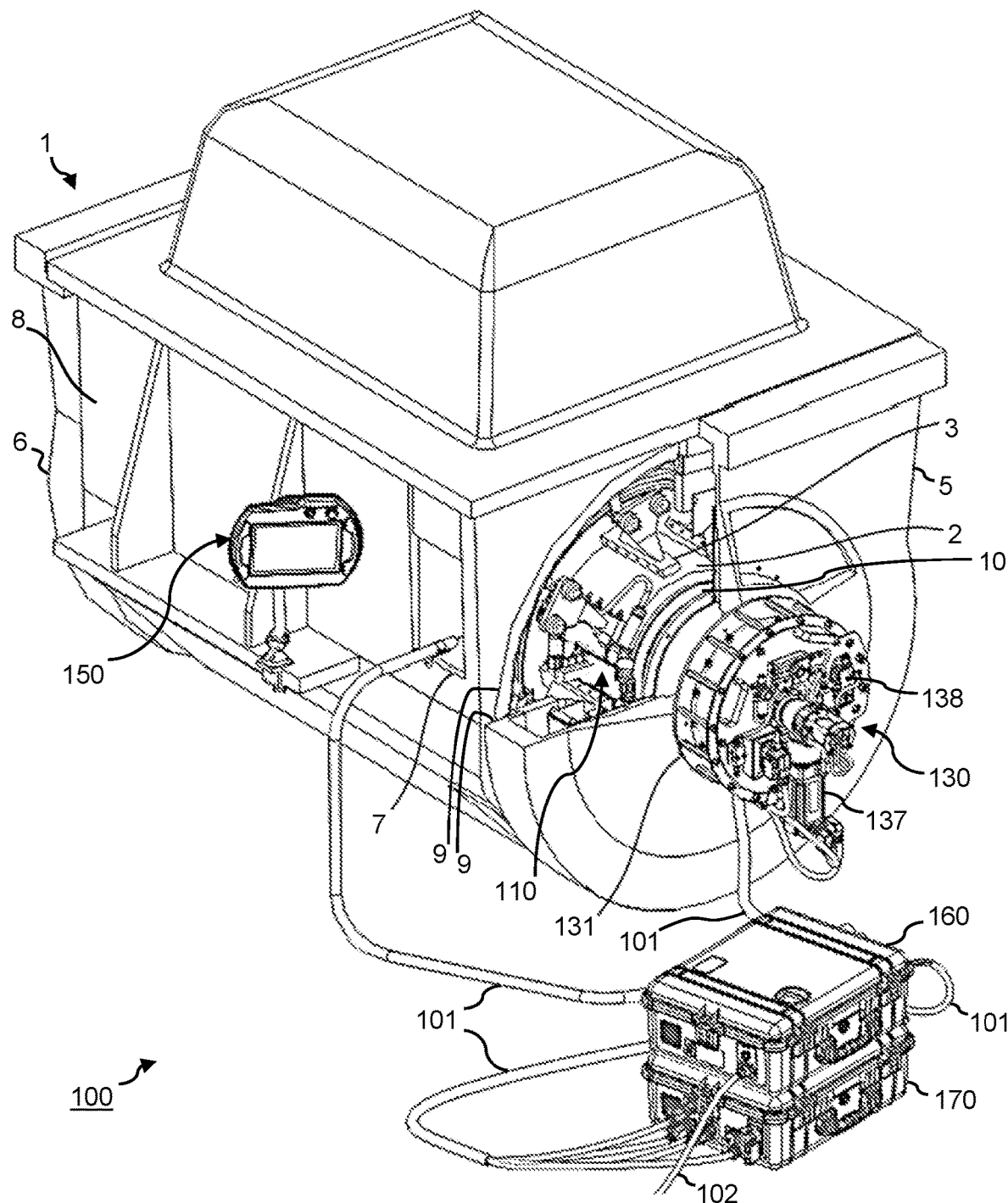
FIG. 1 illustrates an exemplary implementation of a refurbishment system connected to a motor generator, in accordance with certain embodiments of the present disclosure.

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

According to one technical advantage, the present disclosure may provide significant improvements over existing equipment by enabling the refurbishment of a commutator in-place without significant disassembly of the motor generator. For example, when the commutator of a motor generator needs to be refurbished, it may be necessary to perform complex rigging operations to disassemble the motor generator and then extract the entire rotor and send the rotor to a machine shop to be manually refurbished. These operations require that the vehicle be stationed and secured in-place prior to disassembly, and additional time and manpower would be required for rigging and preparation of the disassembly process. In certain embodiments, the presently disclosed motor-generator refurbishment system may only require removal of one inspection window cover-plate from the motor generator in order to perform a complete refurbishment in-situ. Accordingly, a benefit of the present disclosure may include the reduction of significant cost, overhead and time for the refurbishment of motors. In addition, by opening only one access port using the disclosed methods, the motor generator may be exposed to less contamination in the environment. It may therefore be possible to eliminate or reduce some of the environmental provisions currently employed, such as erecting tents or halting work in the vicinity of the machine days in advance.

Another advantage of the presently disclosed MG refurbishment system may include its programmable and repeatable performance. The disclosed system may ensure a repeatable process based on set parameters based on the disclosed automated and/or robotic processes. Additionally, in some embodiments, the system may be programmed to compensate for differences in height along the axis of a cylindrical component and return it to a nominally concentric shape, i.e. removing taper from commutator. The controlled motion of refurbishment or processing devices, as provided by a motion platform of the disclosed system, may generate a superior uniformity of undercutting, resurfacing and chamfering. In certain embodiments, an operator may still be provided with control over the process via an user interface. Similarly, the drive/brake unit may be controlled by utilizing varying rotational speeds for stoning. Preexisting methods and techniques fail to be provide such capabilities. For all operations, in accordance with certain embodiments, the software implementation for the disclosed systems and methods may allow an operator to define linear speeds, rotational speeds, cut depths, and other specific parameters while also providing the option to run sequences of pre-planned coordinated motions.

In accordance with certain embodiments, the disclosed system may also comprise non-binding undercut and chamfering devices. Conventional tools are handheld and implemented manually, and are not applicable to a rigidly mounted implementation. The presently disclosed chamfering and undercut devices are designed with spring-loaded and self-correcting geometries that ensure the disclosed devices maintain cutting pressure and do not become misaligned or overloaded causing breakage. Additionally, in some embodiments, a laser alignment device may be utilized to project a visual aid on the commutator to assist with the installation of refurbishment devices and/or the inspection of the refurbishment process. In certain embodiments, an inspection device may be used to gauge commutator heights and/or the distance and alignment of a commutator bar relative to a refurbishment device mounted on the motion platform.

The presently disclosed systems, devices and methods may provide any one of the following benefits: a reduction in the time and costs for disassembly; an increased speed of refurbishment operations; a more consistent and repeatable process; a reduction in the number of operators required; a decrease in environmental controls; increased portability; a reduction in operator fatigue, risks and accidents; less rework from human error; and, less skill/talent required for acceptable results. In some embodiments, the present disclosure may result in a higher production yield over prior methods and techniques. Further advantages and features of the present disclosure are illustrated in the drawings and described in detail below.

DETAILED DESCRIPTION

The present disclosure comprises a comprehensive in-situ refurbishment system 100 for the refurbishing of components of motor-generator sets or motor generators (MG) 1 that may include electrical rotor components such as slip rings and commutators 2, as shown in FIG. 1. In accordance with certain embodiments, the system 100 may include subsystems comprising: a multi-axis Computer Numerical Control (CNC) motion and machining platform 110 internally mounted within the motor generator 1; a drive/brake system 130 mounted on a DC end 5 of the motor generator 1 for spinning, stopping, and indexing a rotor 10; and, industrialized robotic control systems 160, 170 and user interface 150 that may include hardware and/or software for controlling the refurbishment system 100. The subsystems of the system 100 may comprise a modular implementation designed for transportation, assembly and use in space-constrained environments, such as ships and other large vehicles. Such subsystems may be adapted to be transported within carrying cases 180 that house the control systems 160, 170.

Figure 2:
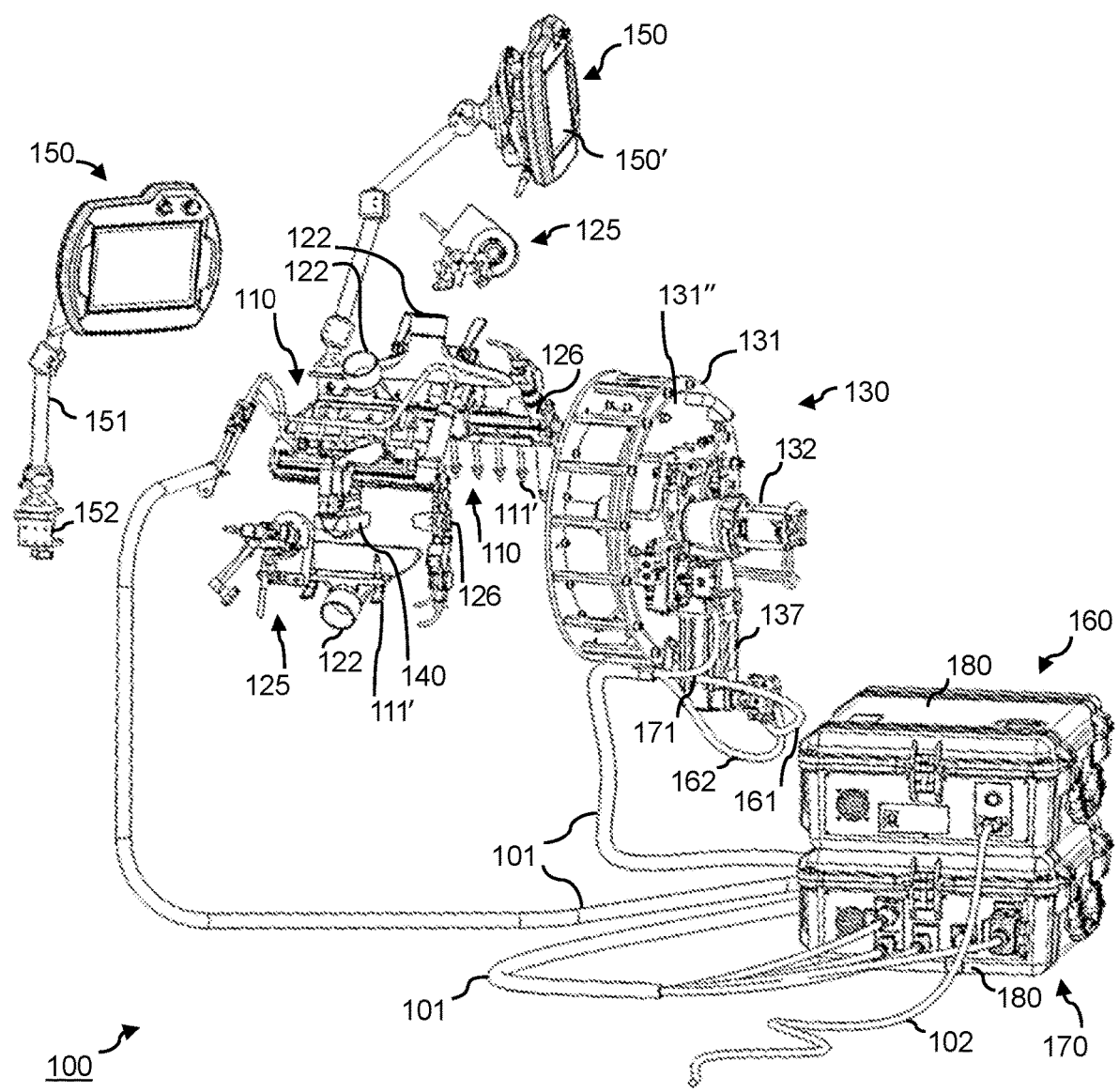
FIG. 2 illustrates the subcomponents of the refurbishment system shown in FIG. 1, in accordance with certain embodiments of the present disclosure.

FIG. 1 is a cutaway diagram, depicting a cutout 9 in the housing 8 of a motor generator 1 for illustration purposes, that shows the internal position of the machining platform 110 within the motor generator 1 in accordance with certain embodiments. In order to be internally installed, the machining platform 110 may be inserted through a window 7 in the housing 8 of a motor generator 1, and may be mounted on a brush holder 3 after the removal of the brushes 4 (not shown). The brushes 4 may comprise sliding contacts that make electrical connections with the rotating part or rotor 10 of a motor generator 1, which may include the commutator bars 2 that rotate on a shaft within a motor generator 1. For further clarity without the visual obstruction of the components of the motor generator 1 shown in FIG. 1, FIG. 2 illustrates the structural relationship of the presently disclosed subsystems of the refurbishment system 100 as positioned and installed on, within and adjacent to the motor generator 1 as shown in FIG. 1.

Figure 3:
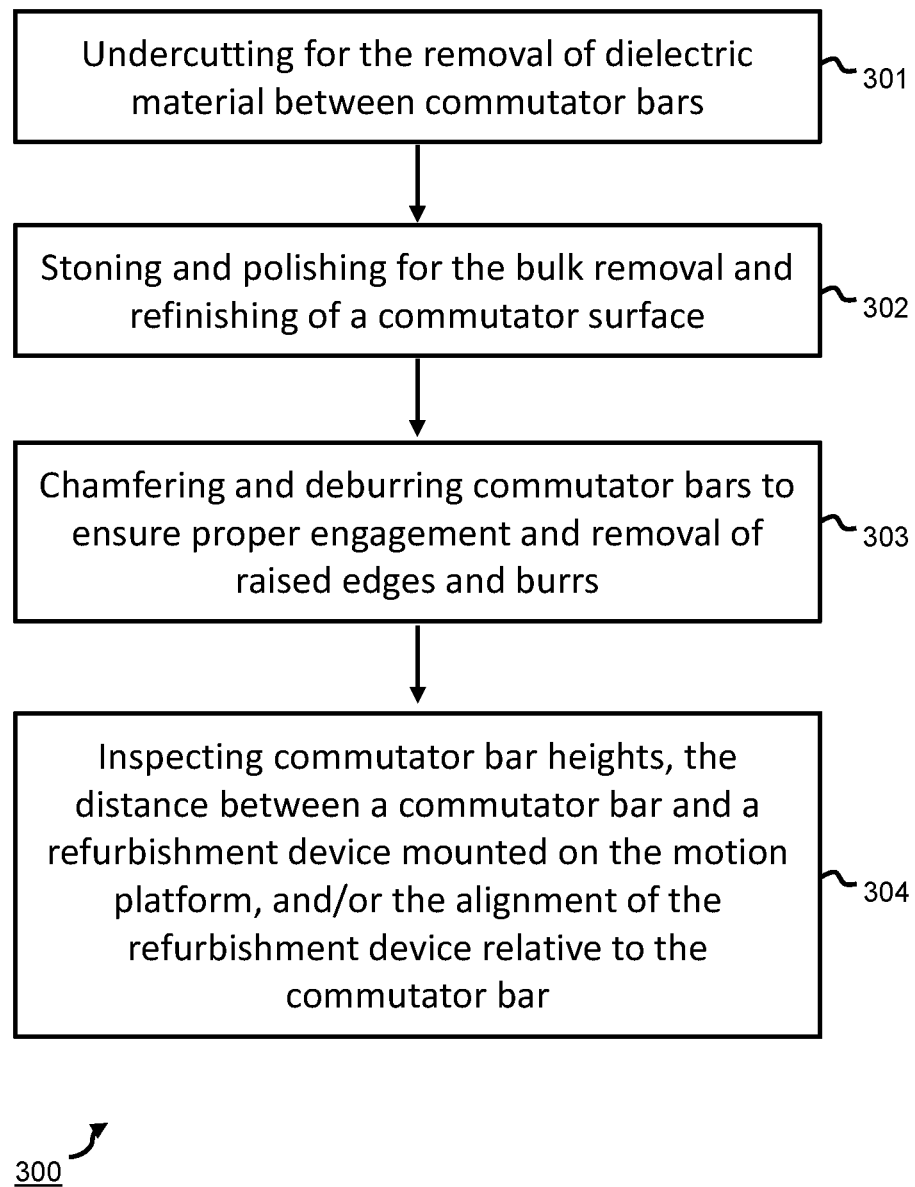
FIG. 3 is a flowchart illustrating exemplary steps of a method for operating a refurbishment system, in accordance with certain embodiments of the present disclosure.

In some embodiments, the system 100 may perform multiple operations applicable to refurbishing large motors 1 that may comprise the following steps for a presently disclosed method 300: removing dielectric material between commutator bars, i.e. undercutting [block 301]; bulk removal and refinishing of a commutator surface, i.e. stoning and polishing [block 302]; chamfering and deburring commutator bars, i.e. chamfering [block 303]; and inspecting commutator bar heights, the distance between a commutator bar 2 and a processing/refurbishment tools/device 140 mounted on the motion platform 110, and/or the alignment of the refurbishment device 140 relative to the distance of a commutator bar 2, i.e. inspection [block 304], as shown in the flowchart illustrated in FIG. 3. The present disclosure may be implemented to resurface and recondition MG commutators 2 without major disassembly of the motor generator 1 and performing the operations (e.g. undercutting, stoning/polishing, and chamfering) of the disclosed method 300 in-place in a space-constrained environment. Components of the presently disclosed refurbishment system 100 may be installed through one or more preexisting inspection windows 7 in the housing 8 of a motor generator 1, and operated via external controls comprising the robotic control systems 160, 170 and user interface 150.

As may be appreciated by those skilled in the art, motor refurbishment is required in many industries. Commutator refurbishment has been a regular maintenance task for vessels equipped with motor generators 1, which was manually performed. Prior methods for refurbishing a commutator 2 included time and labor intensive tasks, especially when performed in limited space environments. It is necessary to maintain the functionality of a motor generator 1, which is extremely sensitive to environmental factors and becomes contaminated naturally over its lifetime. The most frequent refurbishment operation that must be performed is stoning, which comprises the refinishing/resurfacing the surface 2' of a commutator 2 by removing a contaminated exterior from the commutator surface 2'. Historically, this operation was manually performed without removing the MG set 1 from the ship, but with significant disassembly which required the implementation of extensive environmental controls to maintain cleanliness and safety. In certain circumstances, there may be a limit to the number of times the commutator 2 can be stoned without performing additional refurbishment operations such as undercutting and chamfering which typically require a significantly greater amount of time and labor when manually performed.

The undercut operation usually involves cutting the dielectric material present between commutator bars 2 to a specified level below the commutator bar surfaces 2'. A commutator 2 may comprise copper bars or other mechanical segments/devices arranged to reverse armature connections in motor generator sets 1 at the proper instant so that current continues to flow in only one direction, as the commutator bars 2 may be separated from each other by mica insulation that may be cut at a height below the copper segments/bars 2 permitting the commutator 2 to change the generated AC voltage to a pulsating DC voltage. The chamfering operation involves deburring the edges of each commutator bar 2 following undercutting and stoning. Typically, the stoning operation of prior technics involves installing a manually-controlled slide with abrasive grinding stones into the motor generator 1. A skilled technician then installs a rotary drive-interface such as an air motor to one end of the motor generator 1 to achieve a desired commutator rotation speed. When the commutator 2 is up to speed, the technician manually drives stones into the surface and across the commutator 2 to remove dielectric material. The operation requires a progression from coarse to fine stones, with another spin-down and spin-up operation required between each new stone grit. The speed of the commutator rotation, speed of stoning, and amount of stone to infeed during this operation are usually evaluated by an operator who can recognize the expected and/or desired sound during refurbishment. The speed of the commutator rotation is not effectively controllable by the operator as the speed is usually directly dependent on the pressure of the available air connection. The lack of an effective braking mechanism for the commutator 2 significantly increases the time of spin-down between each stone grit change.

Such stoning, undercutting, and chamfering conventionally require rigging operations to disassemble the motor generators 1, which adds a significant overhead to the operation and is especially difficult to achieve in a space-constrained environment. Prior technics lacked the disclosed system 100 to perform undercutting and chamfering operations without major disassembly of motor generators 1. In comparison with historical data, the refurbishment of certain MG sets 1 utilizing the present disclosure reduced the refurbishment time by at least 18%. Prior technics uncontrolled drive-and-brake functionality by way of pneumatic or electric motors with manual mechanical or hydraulic braking, which lack the abilities provided by the present disclosure such as: rotor speed control, indexing, position feedback, torque feedback, rapid braking, and safety interlocks. Previous multi-axis stoning manual platforms also lack the advantages provided by the present disclosure, including: computer-controlled and simultaneous motion in multiple axes, safety interlocks, position feedback and inspection capabilities, provisions for mounting tooling other than stones, camera feedback, or complete refurbishment operations controlled through an inspection window 7 in the housing 8 of a motor generator 1.

In accordance with certain embodiments, the present disclosure may be intended to refurbish motor-generators 1 in-place in a space-constrained environment. The disclosed system 100 may comprise the subcomponents shown in FIGS. 1-2 and 4-11, including: a drive-brake assembly 130, comprising a drive servo-motor 137 and pneumatic brake 138; power conditioning and logic hardware 160, 170; one or more mobile panels 150, comprising user interfaces 150 and touchscreen displays or monitors 150'; one or more motion platforms 110; processing/refurbishment tools/devices 140; one or more sets of cameras 125, 126 monitoring the refurbishment process; and, a modular form factor for such subcomponents adapted for commercial and military transportation, as described below, such that the disassembled subcomponents may be packaged as kits within one or more carrying cases 180.

As a typical example, in accordance with certain embodiments, use of the presently disclosed MG refurbishment system 100 to perform a complete motor-generator refurbishment may comprise of the following process. First, the motor generator 1 must be prepared. The multiple storage cases 180 of the containerized system 100 may be carried by hand into the limited space environment of an engine room where the motor-generator sets 1 operate to power a vessel. Here, technicians may open one access panel or inspection window 7 of the MG 1 and remove several brushes 4 and brush holders 3. Any dust cover may also be removed from the front of the MG 1, in order to allow for installation of the drive-brake assembly 130. The diameter of the commutator 2 may be measured with a pi tape.

Figure 4:
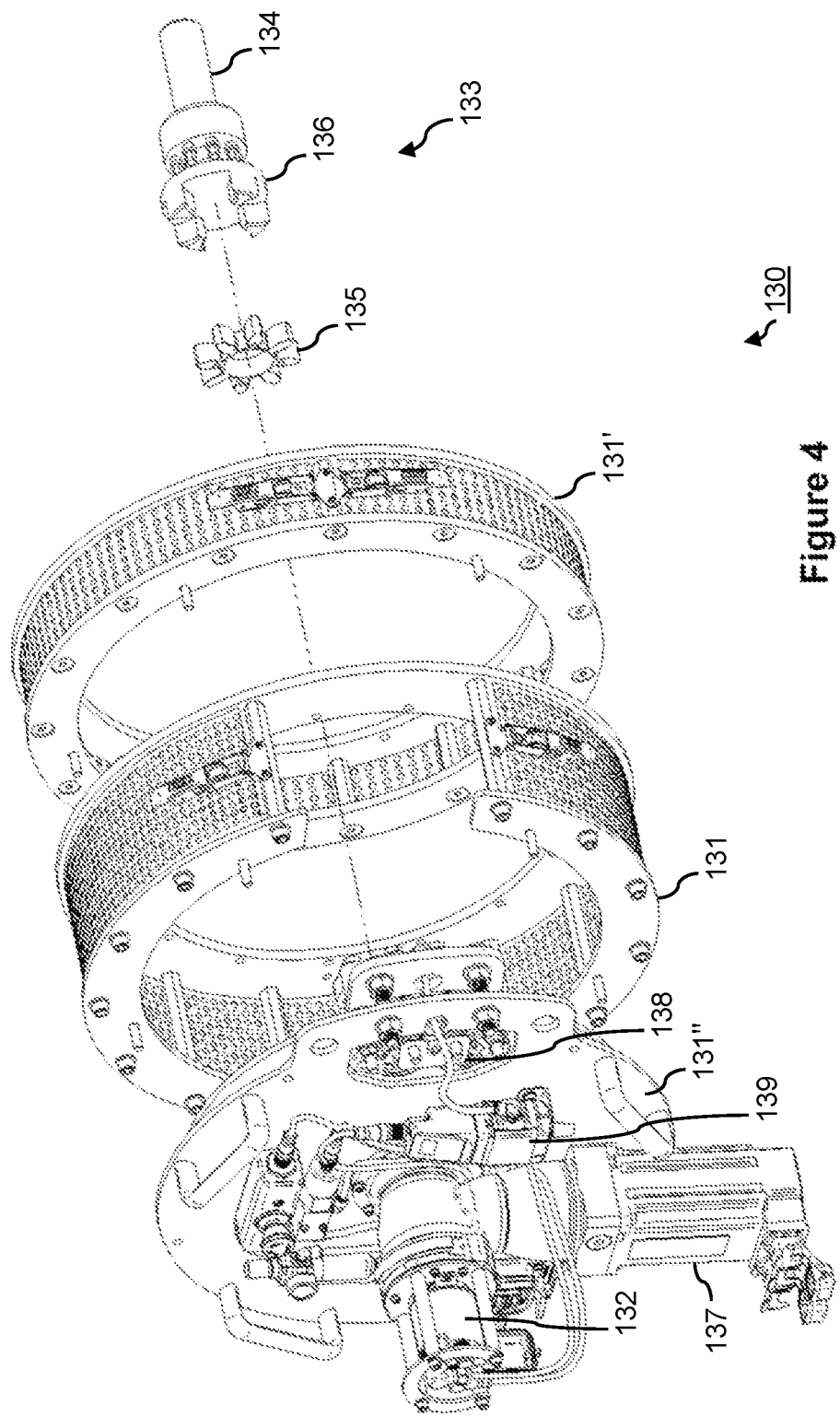
FIG. 4 illustrates an exemplary drive-brake assembly of a refurbishment system, in accordance with certain embodiments of the present disclosure.

Next, the drive-brake assembly 130 may be installed. In accordance with certain embodiments, as shown in FIG. 4, the drive-brake assembly 130 may comprise an end bell 131, an end bell adapter 131', a motor plate 131", a brake encoder 132, a shaft assembly 133, a shaft 134, a spider coupling 135, a multi-jackbolt tensioner (MJT) or Superbolt™ clamping/bolting assembly 136, a drive servo-motor 137, a pneumatic brake 138, and an electro-pneumatic pressure regulator 139. The drive/brake assembly 130 may spin the rotor 10 together with the commutator 2 during stoning operations, and stop the rotation when stoning is complete. The drive/brake assembly 130 may also be used to iterate between commutator slots 2 for the undercut/chamfer operations. The drive portion of the assembly 130 may spin the commutator 2 by use of the servo motor 137. The brake portion of the assembly 130 may utilize a pneumatic brake 138 adapted to connect to a shop air connection. In order to attach the drive/brake assembly 130 to a motor generator 1, an end bell 131 may be utilized without an end bell adapter 131' as shown in FIG. 1.

In some embodiments, referring back to FIG. 4, a backside of an end bell 131 may be attached to an end bell adapter 131' in order to properly space the drive-brake assembly 130 relative to the DC end 5 of the motor generator 1. In end embodiment, the end bell 131 and the end bell adapter 131' may have holes spaced to correspond to bolt holes existing in the DC end 5 such that bolts may fasten the end bell 131 and the end bell adapter 131' to the motor generator 1. Prior to attaching the motor plate 131" to the front side of the end bell 131, the shaft assembly 133 may be installed at a predetermined height relative to the front side of the end bell 131.

For example, the shaft 134 of the shaft assembly 133 may be threaded to correspond to threads within the end of the rotor 10. The shaft 134 may be threaded into rotor end 10' at a desired depth, and the Superbolt™ assembly 136 may be attached to the shaft collar 134', such that the Superbolt™ assembly 136 is even with the front side of the end bell 131, in accordance with certain embodiments. The spider coupling 135 may be mounted on the Superbolt™ assembly 136 in order to provide an effective power transmission without torsional oscillation/vibration and to protect the subcomponents of the drive/brake assembly 130. In some embodiments, a gauge may be used to confirm when the shaft assembly 133 is installed within a desired height range, based on the height of the installed end bell 131 and/or the end bell adapter 131', such that the height of the spider coupling 135 may be adjusted for proper engagement with connectors of the drive servo-motor 137 and pneumatic brake 138 that are mounted on the exterior side of the motor plate 131". The motor plate 131" may be mounted to the front side of the end bell 131 once the shaft assembly 133 is installed at a suitable height to ensure such a proper engagement upon mounting the motor plate 131". In end embodiment, a desired air pressure may be maintained via a brake encoder 132, which may take pressure readings from the brake system and generate corresponding pressure values, together with an electro-pneumatic pressure regulator 139 which may maintain air pressure in proportion to an electric signal.

In certain embodiments, the motion platform 110 may then be installed onto an existing interface on the brush holder/arm 3 as shown in FIG. 1. In some embodiments, the motion platform 110 may be adapted to align with the commutator slots 2 mounted on the rotor 10. Referring to FIG. 2, multiple cameras 125, 126 may be installed in order to provide feedback to the operator during operations, especially operations where refurbishment devices 140 must align to the commutator slots 2. In some embodiments, an overhead camera 125 may provide the user with an overview of refurbishment operations performed by the disclosed system 100 within the motor generator 1. In certain embodiments, a slot camera 126 may provide the user with a view of the commutator slots 2 and the tips of the processing device 140 during the refurbishment process. One or more vacuum ducts 122 may be mounted on other brush arms 3 in order to recover debris emitted during refurbishment. The vacuum ducts 122 may be adapted to connect to vacuum hoses 123 (not shown), which may be connected to vacuums.

Figure 5:
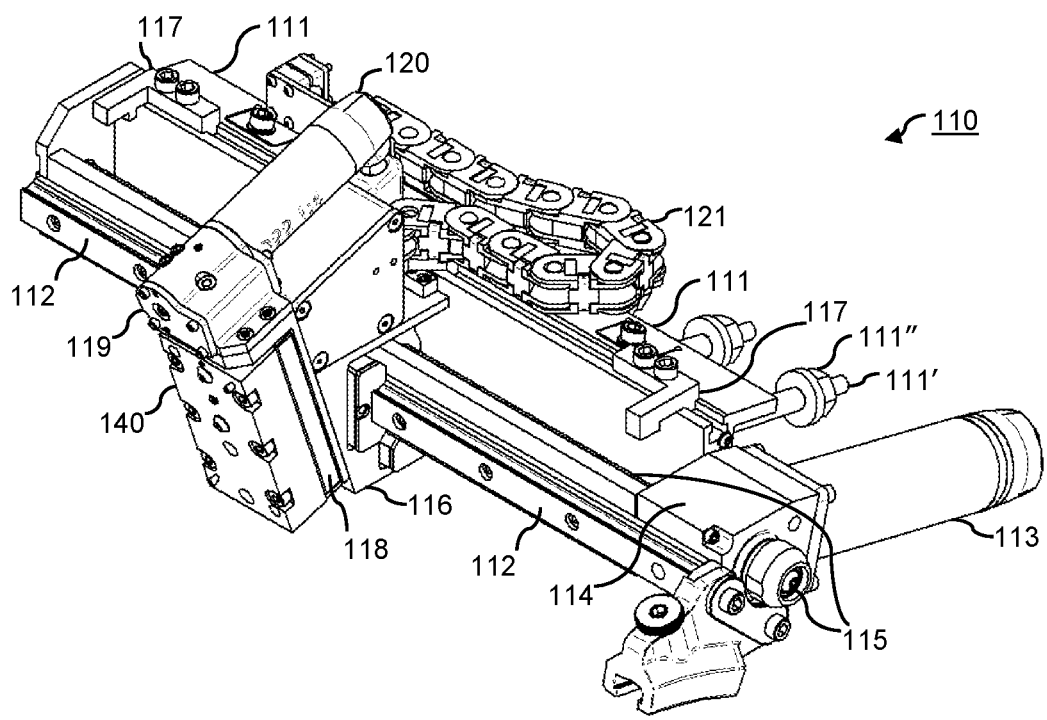
FIG. 5 illustrates an exemplary CNC machining/motion platform of a refurbishment system, in accordance with certain embodiments of the present disclosure.

In accordance with certain embodiments, as shown in FIG. 5, the CNC machining/motion platform 110 may comprise a slide mount 111 adapted to attach to the brush holder/arm 3 of the motor generator 1 shown in FIG. 1. Referring back to FIG. 5, the slide mount 111 may have bolt holes adapted to receive mounting studs/bolts/fasteners 111' configured to correspond with preexisting bolt holes in the brush holder 3, and further configured to receive bolts nuts 111" for securing the slide mount 111 together with the motion platform 110 to the brush holder 3. In some embodiments, studs/bolts 111' and bolts nuts 111" may secure the vacuum ducts 122 as shown in FIG. 2 to the brush arms 3 illustrated in FIG. 1.

As shown in FIG. 5, the motion platform 110 may further comprise a linear-traverse slide 112, a traverse motor 113, a gearbox 114, a ball screw 115, a traverse carriage 116, hard stops 117, an infeed slide 118, a worm gear 119, an infeed motor 120, and an energy chain 121. In certain embodiment, the motion platform 110 may move a predetermined set of processing/refurbishment devices 140 that may be adapted for the undercutting, stoning and polishing, chamfering and deburring, and inspecting of commutator bars 2 as describing herein. Such refurbishment devices 140 may be mounted on an infeed slide 118 moved by a worm gear 119 controlled by an infeed motor 120. The infeed slide 118 may move the refurbishment device 140 toward the commutator 2 or slot surfaces 2'. In some embodiments, an energy chain 121 may comprise an infeed cable that may provide power to the infeed motor 120 and may transmit limit-switch signals that limit movement of the infeed slide 118. The infeed slide 118 may be mounted to the traverse slide 112 via a traverse carriage 116, such that the traverse slide 112 guides the traverse carriage 116 along a linear axis 13 that traverses the longitudinal axis of the motion platform 110. By loosening the mounting bolts 111', the traverse slide 112 may be moved to align the linear axis 13 with the commutator slots 2. In certain embodiments, the linear axis 13 corresponds to the longitudinal axis of the commutator 2 and the motor generator 1 where the motion platform 110 is mounted parallel to the brush holders 3 that are parallel to the commutator 2 and the motor generator 1. Accordingly, the traverse carriage 116 may move along the linear axis 13 of the commutator 2. In some embodiments, a traversing cable may provide power to the traversing motor 113 that controls the gearbox 114, which may turn the ball screw 115 that drives the traverse carriage 116 along the traversing slide 112. Hard stops 117 may be set to limit movement of the traversing slide 112.

Installation of the refurbishment system 100 may include the step of connecting the subsystems via system cables 101, including the user interface 150 and control boxes 160, 170 so that the technician may initiate the generation of system commands to begin the refurbishment process. The system 100 may be used to perform the abovementioned operations, such as undercutting 301, stoning 302, and chamfering 303. In certain embodiments, the operator/technician initiates the generation of commands through the user interface 150 to align the refurbishment devices 140, control the depth of cut, and perform a predetermined number of cuts or passes. Such predetermined subroutines may generate the issuance of specific motion commands to the motion platform 110 and the drive/brake system 130 in order to accomplish the refurbishment process. The subroutines may impose limits that may automatically preclude the refurbishment device/tool 140 from crashing or damaging the commutator 2. The operator may review and confirm each set of actions in order further prevent damage and ensure that the refurbishment process is performed.

In accordance with certain embodiments, various processing/refurbishment devices 140 may be adapted to be mounted and dismounted on the infeed slide 118 to perform the varying processes of the presently disclosed method 300 described herein. In some embodiments, the devices 140 may be equipped with two or more guide pins and/or one or more screws/bolts 140' as described herein that correspond and fit holes in the infeed slide 118 that may be adapted to receive such pins/screws/bolts. This mounting and locking mechanism may reversible such that various devices 140 may be selected from a group of refurbishment/processing devices 140 to be used at varying times during the refurbishment process in a varying order. For example, a visual and/or alignment inspection may conduct before and/or after any of the undercutting 301, stoning 302, and chamfering 303 processes. In an embodiment, the structure of such a mounting and locking mechanism may be reversed such that the devices 140 may have holes adapted to receive pins/screws/bolts that extend from the infeed slide 118. One or more magnets may be embedded in the devices 140 and/or the infeed slide 118 in order to generate a magnetic attraction between the two components strong enough to keep the devices 140 in place while mounting and securing the devices 140 unto the infeed slide 118.

In certain embodiments, the group of refurbishment/processing devices 140 that may be mounted on the motion platform 110 may include a laser alignment device 141 as depicted in FIGS. 6A-6C. The laser alignment device 141 may be utilized to project a visual aid on the commutator 2. In some embodiments, the laser alignment device 141 may project a laser crosshair pattern to be used to align the motion platform 110 to the commutator slots 2. Alignment adjustments may be made by loosening fasteners 111' that secure subcomponents of the motion platform 2, repositioning the subcomponents relative to each other, and retightening the fasteners 111'. As shown in FIG. 6A, the laser alignment device 141 may comprise a switch 141" to activate/deactivate the alignment laser crosshair 149 shown in FIG. 6C. In an embodiment, the laser alignment device 141 may comprise a laser projector 141'.

In some embodiments, the laser alignment device 141 may comprise a slot alignment device 141 that may be mounted upon installation of the motion platform 110 within the motor generator 1 as shown in FIG. 1. The slot alignment device 141 may verify the proper alignment of the motion platform 110 based on the location of the commutator slots 2. A method for installing the slot alignment device 141 may include the step of placing the slot alignment device 141 firmly on the infeed slide 118 in an orientation corresponding to the pins/screws/bolts. The method may include verifying the device 141 is flush so that the magnetic attraction is strong enough to keep the device 141 in place. In some embodiments, the method may include the steps of turning on the slot alignment device 141 to activate laser crosshairs by flipping a switch 141", and jogging the infeed slide 118 towards and/or away from the commutator surface 2' to focus the laser crosshairs. The laser crosshairs may be further focused by turning a knurled head 141''' of the laser diode as shown in FIG. 6A. In an embodiment, the alignment device 141 may be held in place via the aforementioned magnetic attraction without use of any pins/screws/bolts. The alignment device 141 may be powered by an internal battery, such as a CR2032 battery, and the battery may be replaced by removing a cover 141'''' from the housing of the alignment device 141.

In certain embodiments, the group of refurbishment/processing devices 140 may include an inspection device 142 as depicted in FIGS. 7A-7C. The inspection device 142 may be utilized to gauge commutator heights and/or the alignment of the motion platform 110 relative to the commutator 2. In an embodiment, the inspection device 142 may ensure that the motion platform 110 is positioned at a predetermined distance from the commutator 2. The motion platform 110 may comprise an inspection tip or pin 142' that may be pushed inward upon contacting a commutator bar 2 and receiving a biasing force, resulting in a pressure gauge 142" measuring the biasing force that may be recorded and displayed on a pressure gauge face or display 142'''. A method for installing the inspection device 142 may include the step of mounting the device 142 on the infeed slide 118 by aligning and tightening the pins/screws/bolts 140'.

The group of refurbishment devices 140 may include an undercutting device 143 as depicted in FIGS. 8A-8D. In some embodiments, the undercutting device 143 may be adapted to cut and remove mica between the commutator bars 2. The undercutting device 143 may comprise one or more blades 143', which may be replaceable in accordance with certain embodiments. As shown in FIG. 8D, the blades 143' may be adapted to receive a biasing force from a biasing mechanism that may comprise preloaded biasing pins 143", springs 143''' and bolts 143''''. A method for installing the undercutting device 143 may include the step of mounting the device 143 on the infeed slide 118 by aligning and tightening the pins/screws/bolts 140'. To replace the blades 143', the preload biasing pins 143", springs 143''', and bolts 143'''' may be removed. Screws and or hinge pins 143''''' holding the blades 143' may then be removed. The blade 143' may subsequently be removed, and a replacement blade 143' may be installed by the repeating the aforementioned process in reverse.

In accordance with certain embodiments, the undercutting 301 process may utilize a drive/brake indexing function of the drive/brake assembly 130, the cameras 125/126, the undercutting device 143, and the motion platform 110 to remove dielectric material from between the commutator bars 2. A method 800 for undercutting 301, e.g. using the undercutting device 143 shown in in FIGS. 8A-8D, may comprise the following steps: setting an initial tool height relative to the commutator surface 2' using a paper gauge; setting a desired cutting force or bias based on a predetermined set of parameters for a preload and per-cycle infeed phase, wherein such preload and per-cycle infeed parameters may be defined by predetermined instructions programmed in software and/or configured to be executed by a processor adapted to control operations of the presently disclosed refurbishment system 100; setting—via predetermined instructions-a predetermined number of undercutting passes, e.g. the number of times that the motion platform 110 moves the undercutting device 143 back and forth along the linear axis 13 of the commutator 2; setting—via predetermined instructions—an undercutting time-period for undercutting 301; executing the aforementioned instructions, e.g. by running the software, via the processor adapted to control operations of the refurbishment system 100; evaluating the new commutator slot surface 2' depth, e.g. by gauging the commutator heights via the inspection device 142 as described herein, and determining whether additional undercutting passes are required when the commutator surface 2' do not inwardly push the biasing pins 143" with a predetermined force; when the undercut process removes obstructing dielectric material from the commutator bars 2 such that the distance between the motion platform 110 and a commutator bar 2 is reduced, permitting the commutator surface 2' to inwardly push the biasing pins 143" with a predetermined force, then an indication that the undercut process 301 has completed may be recorded and the drive/brake assembly 130 may rotate the rotor 10 along the rotor axis 12 by a predetermined iterative amount so that the motion platform 110 may engage the next, adjacent row/area of commutator slot surface 2' in order to repeat the aforementioned undercutting process 301; validating that the undercutting device 143 is aligned to the next commutator slot surface 2' prior to commencing the undercutting process 301; and, repeating the aforementioned undercutting process 301 for the entire commutator slot surface 2'.

Figure 9A:
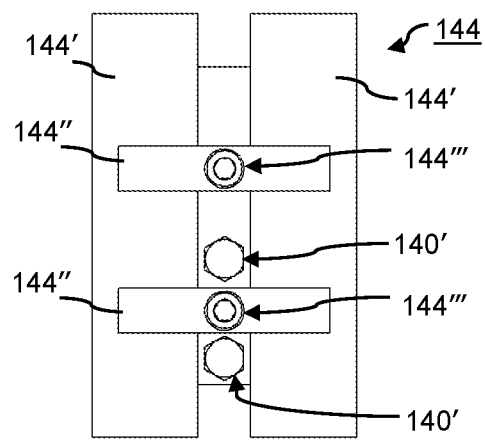
FIGS. 9A-9C illustrate front, side and prospective views of an exemplary stoning device for the CNC machining/motion platform shown in FIG. 5, in accordance with certain embodiments of the present disclosure.
Figure 9B:
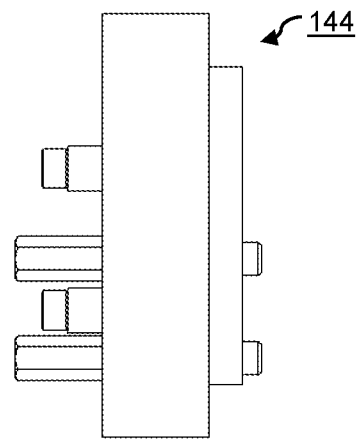
Figure 9C:
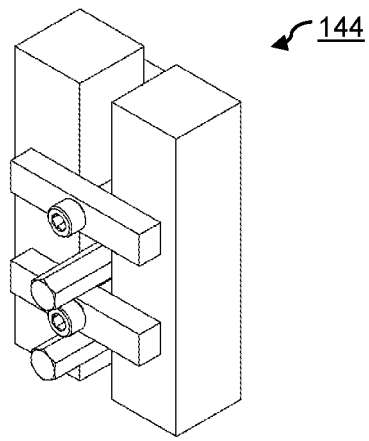

The group of refurbishment devices 140 may include a stoning device 144 as depicted in FIGS. 9A-9C. In some embodiments, the stoning device 144 may be utilized to obtain a predetermined geometry and surface finish for the commutator 2. A method for installing the stoning device 144 may include the step of mounting the device 144 on the infeed slide 118 by aligning and tightening the pins/screws/bolts 140'. The stoning device 144 may be adapted to receive various stoning bars 144' having varying textures, such as extra course (EC), course (C), medium (M), fine (F), polish (P) and extra polish (EP). Such stoning bars 144' may be replaceable. As shown in FIG. 9A, the stoning bars 144' may be attached to the stoning device 144 via mounting braces 144" secured by mounting bolts or screw 144'''. To replace a stoning bar 144', the mounting braces 144" may be loosened and tightened again after another stoning bar 144' is set in place. The height of the stoning bar 144' may be set to a predetermined limit.

In certain embodiments, the stoning 302 process may utilize the drive/brake assembly 130 to spin the commutator 2 and then use the motion platform 110 to move the stoning bar 144' toward the commutator 2 at predetermined speeds. Stoning bars 144' having varying textures may be applied to the commutator 2 in a predetermined order, and processing and controls parameters may be set in a corresponding order. Such parameters may include predetermined speeds and infeed patterns or profiles. For example, the infeed profiles may comprise a square pattern and saw pattern. The infeed profiles may be defined by predetermined instructions programmed in software and/or configured to be executed by a processor adapted to control operations of the presently disclosed refurbishment system 100. A method 900 for stoning 302, e.g. using the stoning device 144 shown in in FIGS. 9A-9C, may comprise the following steps: spinning the commutator 2 up to a predetermined speed; setting an initial height for the stoning device 144 relative to the commutator surface 2' using cameras 125/126 to visually set the stone height near the surface 2'; recording the starting height via predetermined instructions; setting a predetermined maximum processing depth via predetermined instructions, e.g. a maximum difference between the starting height and a measured height received during the stoning process 302; setting—via predetermined instructions-a predetermined infeed pattern and per-pass infeed amount; executing the aforementioned instructions, e.g. by running the software, via the processor adapted to control operations of the refurbishment system 100, and monitoring the performance of the stoning process 302 based on the received measured heights; upon reaching the maximum processing depth, stopping the rotation of the commutator 2 by utilizing the drive/brake assembly 130; evaluating the condition of the commutator 2, e.g. by using the cameras 125/126 to visually determine the grit of the commutator surface 2'; replacing the stoning bar 144' with another stoning bar 144' having a different texture; and, repeating the aforementioned stoning process 302 with the other stoning bar 144' for the entire commutator surface 2'.

Figure 10A:
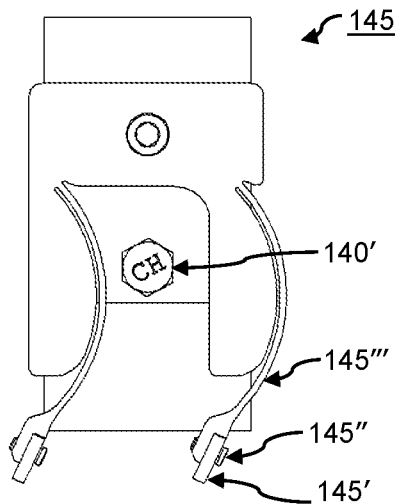
FIGS. 10A-10C illustrate front, side and prospective views of an exemplary chamfering device for the CNC machining/motion platform shown in FIG. 5, in accordance with certain embodiments of the present disclosure.
Figure 10B:
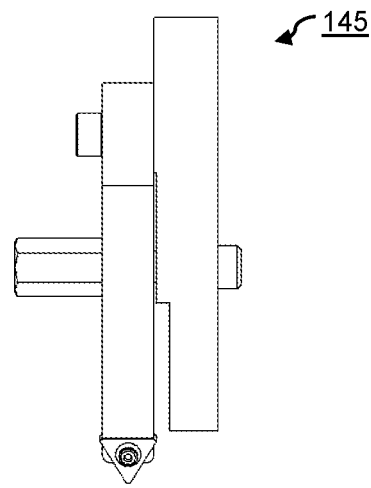
Figure 10C:
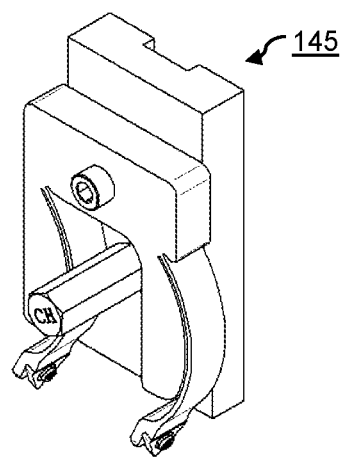

The group of refurbishment devices 140 may include a chamfering device 145 as depicted in FIGS. 10A-10C. In some embodiments, the chamfering device 145 may be utilized to remove the burrs at the edges of the commutator grooves left by the stoning process 302. A method for installing the chamfering device 145 may include the step of mounting the device 145 on the infeed slide 118 by aligning and tightening the pin/screw/bolt 140'. The chamfering device 145 may be adapted to hold spring-loaded chamfering inserts 145' mounted via insert screws 145" onto the insert springs 145'''. The chamfering inserts 145' may be replaced by loosening the insert screws 145".

In certain embodiments, the chamfering process 303 may utilize a drive/brake indexing function of the drive/brake assembly 130 along with cameras 125/126, the motion platform 110, and the chamfering device 145 to align to a commutator slot surface 2' and deburr the edges of the commutator bars 2 along each slot. A method 1000 for chamfering 303, e.g. using the chamfering device 145 shown in in FIGS. 10A-10C, may comprise the following steps: setting an initial height for the chamfering device 145 relative to the commutator slot surface 2' using a paper gauge; setting a predetermined cutting force by setting a preload bias via the insert springs 145''' for the chamfering device 145; setting—via predetermined instructions-a predetermined number of chamfering passes, e.g. the number of times that the motion platform 110 moves the chamfering device 145 back and forth along the linear axis 13 of the commutator 2; executing the aforementioned instructions, e.g. by running the software, via the processor adapted to control operations of the refurbishment system 100; monitoring and evaluating the performance of the chamfering process 303; e.g. by using the cameras 125/126 to visually determine the grit of the edges of the commutator surface 2' and determining whether to conduct additional chamfering passes; when the chamfering process removed the visible burrs at the edges of the commutator grooves, then an indication that the chamfering process 303 has completed may be recorded and the drive/brake assembly 130 may rotate the rotor 10 along the rotor axis 12 by a predetermined iterative amount so that the motion platform 110 may engage the next, adjacent row/area of commutator slot surface 2' in order to repeat the aforementioned chamfering process 303; validating that the chamfering device 145 is aligned to the next commutator slot surface 2' prior to commencing the chamfering process 303; and, repeating the aforementioned chamfering process 303 for the entire commutator slot surface 2'.

Figure 11:
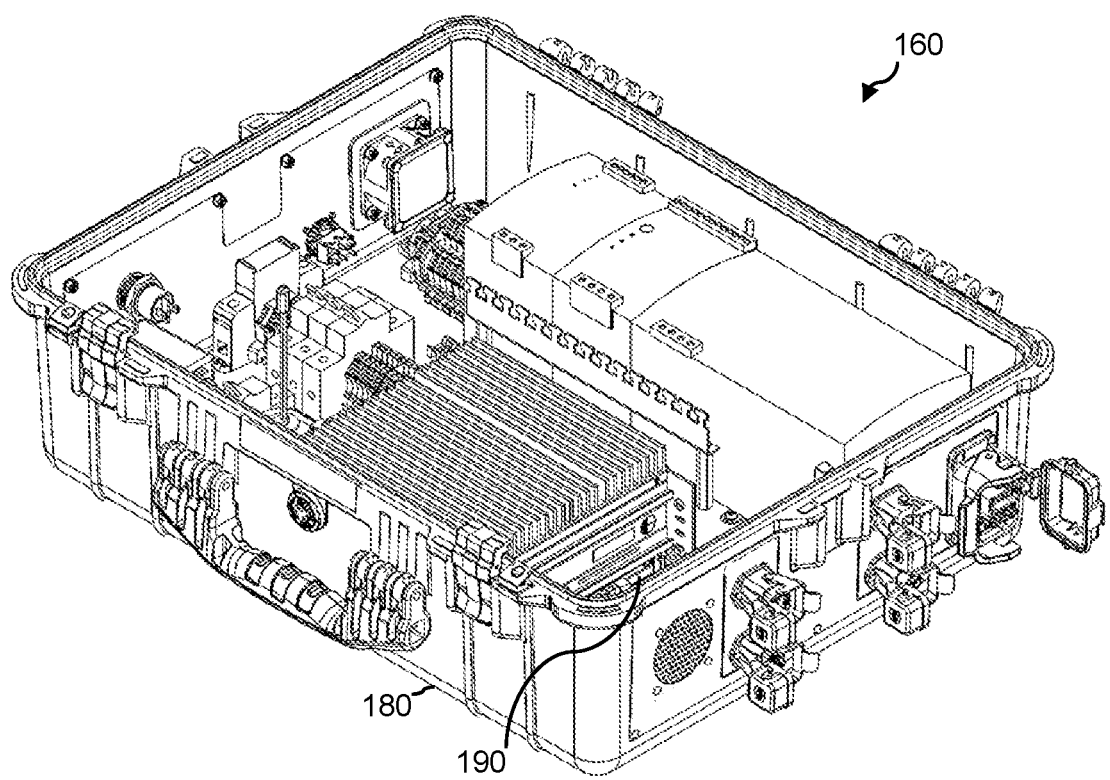
FIG. 11 illustrates subcomponents of an exemplary 110 VAC control box housed with a carrying case, in accordance with certain embodiments of the present disclosure.

In some embodiments, the present disclosure may be implemented modularly for transportation purposes in order to carry the subcomponents of the refurbishment system 100 to space-constrained environments. For example, in some embodiments, power conditioning and logic hardware may be stored and transported within one or more carrying cases 180. As shown in FIG. 11, such a carrying cases 180 for the 110 VAC control box 160 may house power-conditioning equipment, a battery backup, an emergency power disconnect mechanism, and on/off button. In an embodiment, the carrying cases 180 for the 110 VAC control box 160 may contain a processor 190, a computer device, and memory. The 110 VAC control box 160 may provide conditioned power to other subsystem components, such as the 24 VDC control box 170 and the drive servo-motor 137 for the drive-brake assembly 130. In certain embodiments, referring back to FIG. 2, the carrying cases 180 for the 24 VDC control box 170 houses a system controller that may control subsystems for the disclosed system 100 and communicate with the user interface 150. The 24 VDC control box 170 may process and store input received through the mobile panels 150 and cameras 125, 126. In an embodiment, the carrying cases 180 for the 24 VDC control box 170 may contain a computer device, processors and memory. The 24 VDC control box 170 may control the cameras 125, 126, the mobile panel 150, the motion platform 110, and the drive/brake hardware of the drive/brake assembly 130. The cameras 125, 126 may include lights, which may also be controlled via the mobile panel 150. The subsystems and/or subcomponents of the disclosed system 100 may connect and communicate with each other via the cables 101. In an embodiment, subsystems and/or subcomponents may wirelessly communicate as described herein. For example, the mobile panel 150 may be adapted to wirelessly communicate with, and control, the motion platform 110, the drive-brake assembly 130 and/or one or more of the cameras 125, 126 and/or control boxes 160, 170 as well as peripheral devices such as the vacuums connected to the vacuum ducts 122 via the vacuum hoses 123.

The present disclosure may be applied to any rotating piece or member 2 of machinery 1, such as a slip ring or commutator 2 of a motor-generator set 1, motor 1, or generator 1. The drive-brake assembly 130 may be connected to such motor-generator sets 1, motors 1, or generators 1. In certain embodiments, portions of the present disclosure may be applied to other rotating machinery 1 that require inspection or resurfacing, such as drive shafts or pumps.

This present disclosure may implement machine vision and/or machine learning to recognize features such as slots, scratches, or other defects. Inspection tools may be utilized to allow the disclosed system to measure diameters, map the contours of a rotating or stationary surface, probe heights, and/or make related measurements. These data could be used by the disclosed system to improve processing or externally by inspection and acceptance personnel.

In accordance with some embodiments, the system circuitry may include any combination of hardware, software, firmware, APIs, and/or other circuitry. The system circuitry may be implemented, for example, with one or more systems on a chip (SoC), servers, application specific integrated circuits (ASIC), field programmable gate arrays (FPGA), microprocessors, discrete analog and digital circuits, and other circuitry. The system circuitry may implement any desired functionality of the disclosed system. As just one example, the system circuitry may include one or more instruction processor and memory. The processor may be one or more devices operable to execute logic. The logic may include computer executable instructions or computer code embodied in the memory or in other memory that when executed by the processor, cause the processor to perform the features implemented by the logic. The computer code may include instructions executable with the processor. Logic, such as programs or circuitry, may be combined or split among multiple programs, distributed across several memories and processors, and may be implemented in a library, such as a shared library (e.g., a dynamic link library or DLL).

The memory stores, for example, control instructions for executing the features of the disclosed system. Examples of the memory may include non-volatile and/or volatile memory, such as a random access memory (RAM), a read-only memory (ROM), an erasable programmable read-only memory (EPROM), or flash memory. Alternatively, or in addition, the memory may include an optical, magnetic (hard-drive) or any other form of data storage device. In one implementation, the processor executes the control instructions to carry out any desired functionality for the disclosed system, including without limitation those attributed to data/reflection receiver (e.g., relating to the data receiver circuitry), image generation, and/or profiler results generation. The control parameters may provide and specify configuration and operating options for the control instructions, and other functionality of the computer device.

The computer device may further include various data sources, as described herein. Each of the databases that are included in the data sources may be accessed by the system to obtain data for consideration during any one or more of the processes described herein. For example, the data receiver circuitry may access the data sources to obtain the information for generating the images and the reflection returns. In an embodiment, a data receiver circuitry may be configured to receive reflected signals.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

In some embodiments, the computer device may include communication interfaces, system circuitry, input/output (I/O) interface circuitry, and display circuitry. The communication interfaces may include wireless transmitters and receivers (herein, "transceivers") and any antennas used by the transmit-and-receive circuitry of the transceivers. The transceivers and antennas may support Wi-Fi network communications, for instance, under any version of IEEE 802.11, e.g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, $I^2C$, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives. The presently disclosed instructions and code are examples, which may vary as understood by those skilled in the art, that are listed in order to illustrate the nature of certain embodiments.

What is claimed is:
1. A method for using a system, comprising the steps of:
  removing, via an undercutting device, material from a portion of a rotating member;
  polishing, via a stoning device, the portion of the rotating member; and, deburring, via a chamfering device, the portion of the rotating member;

wherein the removing step comprises undercutting dielectric material located on commutator slot surfaces between commutator bars, wherein the rotating member is a commutator comprising the commutator bars, and the portion of the rotating member comprises the commutator slot surfaces between the commutator bars.

2. A method of claim 1, further comprising the steps of:

generating, via an alignment device, an alignment laser crosshair, wherein the alignment laser crosshair is projected on the portion of the rotating member; and, aligning a motion platform based on the alignment laser crosshair.

3. The method of claim 1, wherein the polishing step comprises stoning commutator bar surfaces, the portion of the rotating member further comprising the commutator bar surfaces.

4. The method of claim 3, wherein the deburring step comprises chamfering edges of the commutator bars, the portion of the rotating member further comprising the edges of the commutator bars.

5. A method of claim 4, further comprising the step of:

inspecting, via an inspection device, a height of the commutator bars based on a biasing force measured by a pressure gauge of the inspection device.

\* \* \* \* \*